United States Patent
Chen et al.

(10) Patent No.: US 7,415,562 B2
(45) Date of Patent: Aug. 19, 2008

(54) VARIABLE-FUNCTION OR MULTI-FUNCTION APPARATUS AND METHODS

(75) Inventors: Yancy T. Chen, Campbell, CA (US);
Elizabeth B. Diaz, Woodside, CA (US);
David R. Smith, Santa Cruz, CA (US);
Michael C. Ip, Fremont, CA (US); Peter Lee, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 58 days.

(21) Appl. No.: 11/207,118

(22) Filed: Aug. 17, 2005

(65) Prior Publication Data
US 2005/0283557 A1    Dec. 22, 2005

Related U.S. Application Data

(62) Division of application No. 10/082,651, filed on Feb. 25, 2002, now Pat. No. 7,058,734.

(51) Int. Cl.
*G06F 13/00* (2006.01)
(52) U.S. Cl. .............. 710/300; 710/110; 710/8
(58) Field of Classification Search ......... 710/300–304, 710/110, 305, 306, 313–315
See application file for complete search history.

(56) References Cited

U.S. PATENT DOCUMENTS

| 5,696,500 | A | 12/1997 | Diem |
| 6,434,343 | B1 | 8/2002 | Kobayashi et al. |
| 6,658,508 | B1 * | 12/2003 | Reiss et al. ................. 710/100 |
| 6,694,428 | B2 * | 2/2004 | Lemke et al. ................. 713/1 |
| 6,735,663 | B2 * | 5/2004 | Watts et al. ................. 710/313 |
| 6,848,014 | B2 * | 1/2005 | Landron et al. ............. 710/303 |

OTHER PUBLICATIONS

"Simple Devices", press release dated Dec. 18, 2001. [webpages] [online]. Retrieved on Feb. 19, 2002. Retrieved from the internet: http://www.simpledevices.com/press release/ release. Total pages: 6 pages.

* cited by examiner

*Primary Examiner*—Khanh Dang

(57) ABSTRACT

An apparatus capable of interacting with another device, includes: a module configured to provide a functionality, where the apparatus is configurable to support a second module for providing an additional functionality in order to permit variable functionality by the apparatus. The functionality may relate to an input-function and/or an output function. A method of providing functionality in a variable-function device, includes: removing a functionality from another device that can communicate with the variable-function device; and providing the removed functionality in the variable-function device.

4 Claims, 19 Drawing Sheets

VARIABLE-FUNCTION OR MULTI-FUNCTION APPARATUS AND METHODS

CROSS-REFERENCE TO RELATED APPLICATION

This application is a divisional of U.S. patent application having Ser. No. 10/082,651, filed Feb. 25, 2002 now U.S. Pat. No. 7,058,734, which is hereby incorporated herein by reference. Benefit of all earlier filing dates is claimed for all common subject matter.

TECHNICAL FIELD

This disclosure relates generally to computer systems, and more particularly to a variable-function (and/or multi-function) apparatus and method.

BACKGROUND

Computers (such as personal computers, notebooks, laptops, palmtops, hand-held processing devices, and/or other types of computing devices) typically show notification items and other graphical items in an area of their display screen. Such notification items include, for example, electronic mail arrival notifications, instant messaging notifications, low battery-power warnings, and/or the like. These notifications can often interrupt the images or items being viewed by the computer user. As a result, these notifications can make the viewing experience of the user less pleasant, particularly if the user is viewing, for example, an entertainment-related image or program on the computer screen or if the user does not wish to be distracted while using the computer. The above-mentioned notification items may also clutter the display screen presentation of the computer, and/or may otherwise confuse or cause an inconvenience to the computer user, particularly if, for example, the computer screen has a small viewing surface area.

In addition, some computer users may place the computer underneath their desks or tables in order to increase the available surface area on their desks or tables. As a result, these computer users will not be able to view any notifications that may occur on the out-of-sight computer display screen or on a computer display screen that has been turned off (if there is a display on the PC itself).

In addition, functionalities in current computers continue to increase. As a result, the base systems of current computers are being burdened (and/or are becoming more complex and expensive) due to the increasing functionalities.

Current computers also integrate extra buttons, additional sensitive or fragile components, infrared (I/R) receivers, and/or other components into the computer bezel. The extra buttons and/or sensitive/fragile components typically result in higher support/service requirements and in increased costs of services for a computer device. Additionally, these additional components in the bezel may increase the manufacturing and design costs for a computer device.

For an I/R receiver integrated in the bezel, the I/R signal from the remote control device must be received in the line-of-sight of the I/R receiver. Thus, an I/R receiver integrated in or attached to the bezel will not be able to receive the I/R signals from a remote control device if, for example, the computer bezel is on the floor or is obstructed by an item on the user's desk.

Therefore, the above-described products typically are limited to particular capabilities and features and suffer from a number of constraints related to high cost, limited functionality, complexity in use, higher service/support requirement, increased manufacturing and design issues, inconvenience for the computer user, and/or other constraints.

SUMMARY

In accordance with an embodiment of the invention, an apparatus capable of interacting with another device, includes: a module configured to provide a functionality, where the apparatus is configurable to support a second module for providing an additional functionality in order to permit variable functionality by the apparatus. The functionality may relate to an input-function and/or an output-function.

In another embodiment, an apparatus capable of interacting with another device, includes: a module configured to shift a functionality from the other device to the module, where the apparatus is configurable to support a second module for providing an additional functionality in order to expand the functionality of the apparatus.

In another embodiment, a method of manufacturing a variable-function device, includes: providing a module configured to provide a functionality, where the variable-function device is configurable to support a second module for providing an additional functionality.

In another embodiment, a method of providing functionality in a variable-function device, includes: removing a functionality from a computer that can communicate with the variable-function device; and providing the removed functionality in the variable-function device.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF PREFERRED EMBODIMENTS

In the description herein, numerous specific details are provided, such as examples of components and/or methods, to provide a thorough understanding of embodiments of the invention. One skilled in the relevant art will recognize, however, that an embodiment of the invention can be practiced without one or more of the specific details, or with other apparatus, systems, methods, components, materials, parts, and/or the like. In other instances, well-known structures, materials, or operations are not shown or described in detail to avoid obscuring aspects of embodiments the invention.

Figure 1:
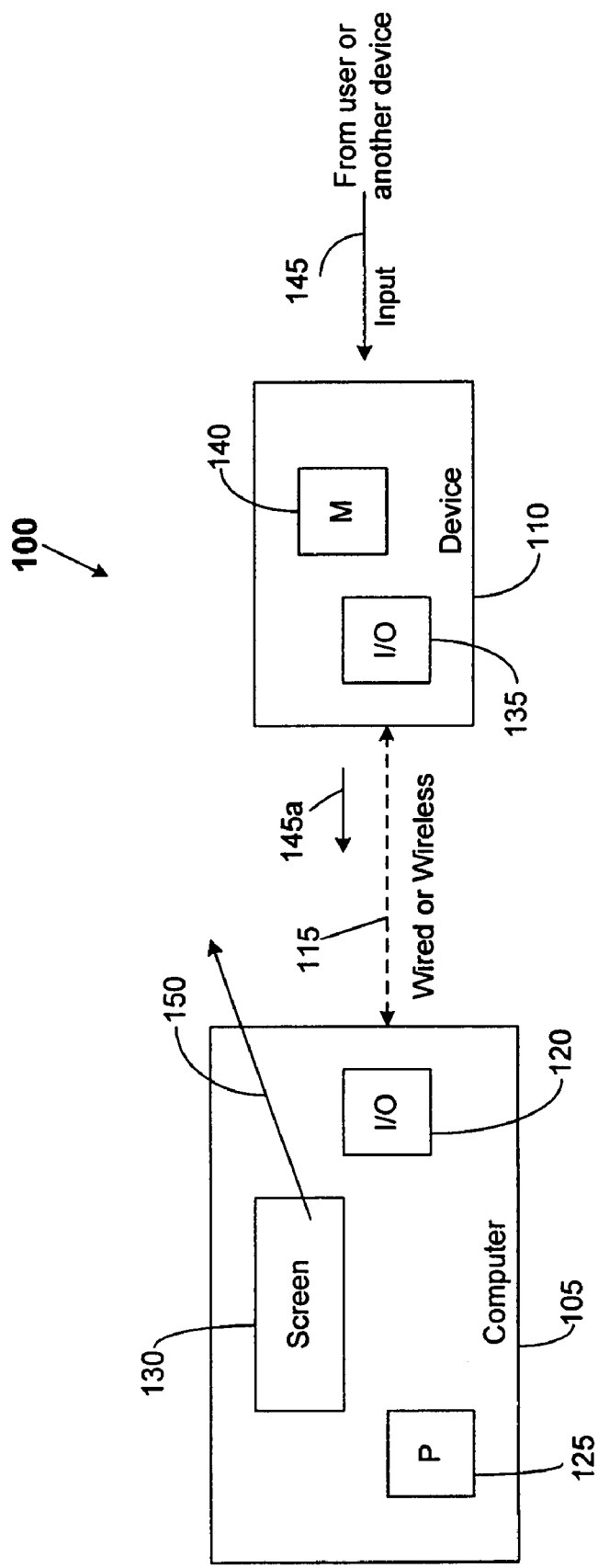
FIG. 1 is a block diagram of an apparatus in accordance with an embodiment of the invention.

FIG. 1 is a block diagram of a system 100 in accordance with an embodiment of the invention. The system 100 may include a computer 105, and a variable-function device 110 that can communicate with the computer 105 via communication path 115. It is understood that for purposes of explaining functionalities of embodiments of the invention, the elements in the drawings are not necessarily drawn to scale. As described below, the communication links shown in the drawings, such as, for example, the communication path 115 or the path of input 145, may be a wired connection, wireless connection, bus connection, network connection, and/or other types of suitable communication links.

The computer 105 may be, for example, a personal computer, notebook, laptop, palmtop, handheld processing device, and/or another type of computing device. However, as described in another embodiment below, the computer 105 may instead be another type of device, such as, for example, a printer or other peripheral devices.

Typically, the computer 105 includes an input/output (I/O) interface 120, a processor 125, and a display screen 130. For purposes of describing embodiments of the invention, other known elements in the computer 105 have been omitted in FIG. 1.

In one embodiment of the invention, the variable-function device 110 includes an I/O interface 135 and at least one module 140 for performing at least one particular function (or functionality) as described further below. As also described below in another embodiment, at least an additional module for performing a particular functionality may be added to (or integrated with) the variable-function device 100 in order to permit the variable-function device 110 to provide a variable number of functionalities. The I/O interfaces 120 and 135 are coupled by the communication link 115 so that communication (or interaction) can occur between the computer 105 and the variable-function device 110. The communication link 115 may be a wired or wireless communication path. For example, the communication link 115 may be a cable, a wire(s), a bus connection such as a universal serial bus (USB) or another type of bidirectional bus, and/or other suitable wired or wireless links.

USB is a serial bus for connecting peripherals to a computer, and was developed by Intel Corporation, Santa Clara, Calif. The USB external bus standard supports data transfer rates of, for example, approximately 480 Mbps (480 million bits per second), with possibilities of greater bandwidth in the future. A single USB port can be used to connect up to, for example, about 127 peripheral devices, such as mice, modems, and keyboards. USB also supports Plug-and-Play (PnP) installation, hot plugging, and multiple data streams.

Of course, the communication link 115 may also be a connection in a local area network (LAN), wide area network (WAN), or another type of network where the computer 105 and the variable-function device 110 can communicate with each other via paths in the network.

The communication link 115 may also be a wireless path where, for example, infrared (I/R) or radio frequency (RF) communication can occur between the computer 105 and the variable-function device 110. A suitable wireless protocol, such as, for example, the Bluetooth wireless protocol, the Digital Enhanced Cordless Telecommunications (DECT) technology, or the IEEE 802.11 standards, may be used in the wireless communication process between the computer 105 and the variable-function device 110.

The I/O interfaces 120 and 135 may be, for example, serial ports, parallel ports, universal serial bus (USB) ports or other bus ports, infrared interfaces, radio frequency (RF) interfaces, transceivers, receivers and transmitters, other wired communication interfaces, other wireless communication interfaces, and/or other suitable communication interfaces.

The interface types for the I/O interfaces 120 and 135 will typically depend on the type of communication link 115 between the computer 105 and the variable-function device 110, and/or on the constraints in the computer 105 and the variable-functional device 110.

In one embodiment the variable-function device 110 includes an input-function module 140 that can provide an input-related function (or input-related functionality). Examples of input related functions or functionalities are described in detail below. As also described below, the variable-function device 110 can also include, for example, an output-function module, a combination of at least one input-function module and at least one output-function module, multiple input-function modules, multiple output-function modules, a single input-function module and multiple output-function modules, a single output-function modules and multiple input-function modules, and/or multiple input-function and output-function modules.

The input-function module 140 can receive an input 145 from a user (or from another device). The input 145 may be processed (e.g., encoded or decoded) by the I/O interface 135 for transmission via communication link 115 as signal 145a. The signal 145a is then processed (e.g., decoded or encoded) by the I/O interface 120 in the computer 105. Based upon the signal 145a (which is, in turn, based upon the input 145), the processor 125 in the computer 105 can permit or execute a desired function or feature, such as, for example, switching the computer 105 into an on-state, having the computer 105 send an e-mail in a network, or showing a content or program 150 on the computer screen 130. Thus, an input 145 (e.g., the user pressing one button or other user-actions) may be performed by the user via the variable-function device 110 to permit a desired operation or feature to be performed in the computer 105.

However, it is noted that an input 145 may not necessarily be transmitted via the link 115 to permit a desired event occurrence in the computer 105. For example, the input 145 may be transmitted to another device via another communication path. As another example, the input-function module 140 may be a memory device that can store data as provided by the input 145. This stored data may, for example, be subsequently read by the computer 105 or by any other suitable device that can communicate with the variable-function device 110. As also described below, in response to an input 145, the variable-function device 110 may provide an output function (or output functionality). For example, an input 145 may cause the variable-function device 110 to output a picture image, a photograph, an advertisement, a text message, lighting, music or other audio output, a logo such as an "HP" logo from HEWLETT-PACKARD COMPANY of Palo Alto, Calif., a video, and/or other output functionalities, as described in detail below.

Various known design schemes or methods for integrating a component in a device may be used to integrate or include an input-function module 140 in a variable-function device 110. An example of a suitable design scheme or method may be of the type used for manufacturing the product known as JORNADA from HEWLETT-PACKARD COMPANY.

Figure 2:
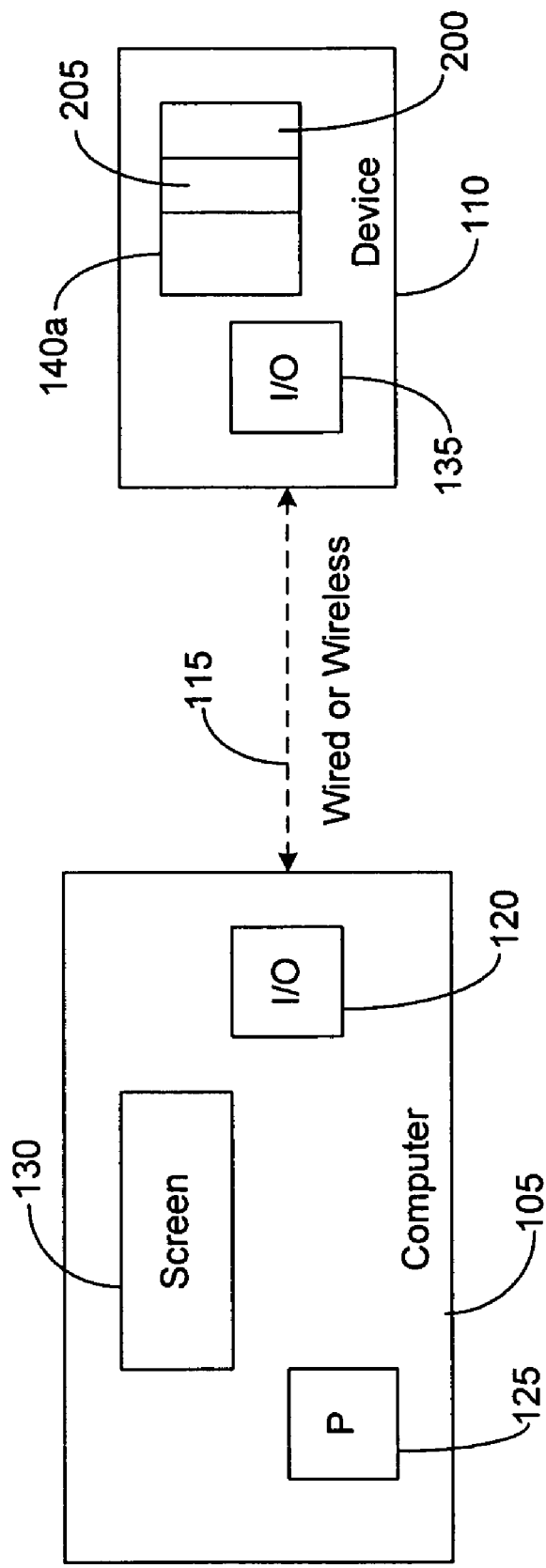
FIG. 2 is a block diagram of an apparatus in accordance with another embodiment of the invention.

As an example as shown in FIG. 2, the input-function module 140 in FIG. 1 may be a module 140a to permit a user to change a mode in the computer 105. In this specific case, the module 140a may include an input stage 200 that may be, for example, a mode switching button(s) or mode control element(s), a light-detector, a sound-detector (e.g., a microphone), and/or other suitable elements that can accept an input command. The module 140a may further include an input interface 205 for transmitting or processing the input received by input stage 200. The input interface 205 may be, for example, a matrix switch (e.g., a 3-by-5 matrix switch).

Figure 3:
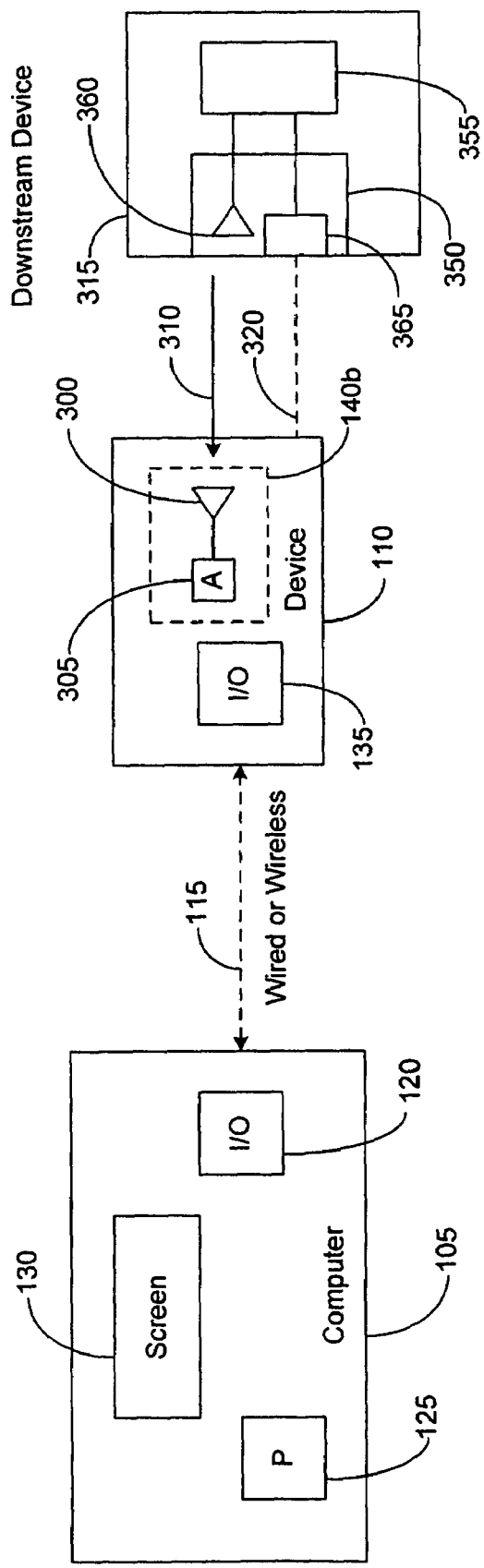
FIG. 3 is a block diagram of an apparatus in accordance with another embodiment of the invention.

As another example as shown in FIG. 3, an input-function module 140b may include an input stage 300 that may be a receiver (or transceiver) and an amplifier stage 305 for amplifying to signals from the receiver. The receiver can receive a wireless input signal(s) 310 from a user via a device 315 such as, for example, a remote control device, microphone, network node, digital camera, infrared (I/R) blaster, another computer or processing device, and/or other types of devices. For example, the device 315 may be a node, in which case, the communication path defined by the input signal 310 is a network path. The input signal 310 is received by the receiver and amplified by the amplifier 305 and transmitted via communication link 115 to permit the computer 105 to perform desired functions. As another example, the device 315 may include a remote control device for sending inputs 310 or other commands to the variable-function device 110. As noted above, in some instances, an input (such as the input 310) to the variable-function device 110 is not necessarily transmitted via communication link 115 to the computer 105.

The device 315 may include, for example, an output interface 350 and a source 355 to permit the transmission of the signals 310 to the variable-function device 110. The interface 350 may include, for example, a transmitter (or transceiver) 360, a signal driver 365, and/or other suitable components to permit the transmission of the signals 310.

The input signal 310 may be, for example, infrared signals, RF signals, and/or other wireless commands or signals. The receiver 300 may also be configured to receive other frequencies of the electromagnetic spectrum such as, for example, Ultrahigh Frequency (UHF), Very High Frequency (VHF), microwave, and/or other frequencies. The input signals 310 may also be wire-transmitted signals if an optional wire or bus link 320 is implemented between the variable-function device 110 and the device 315.

Figure 4:
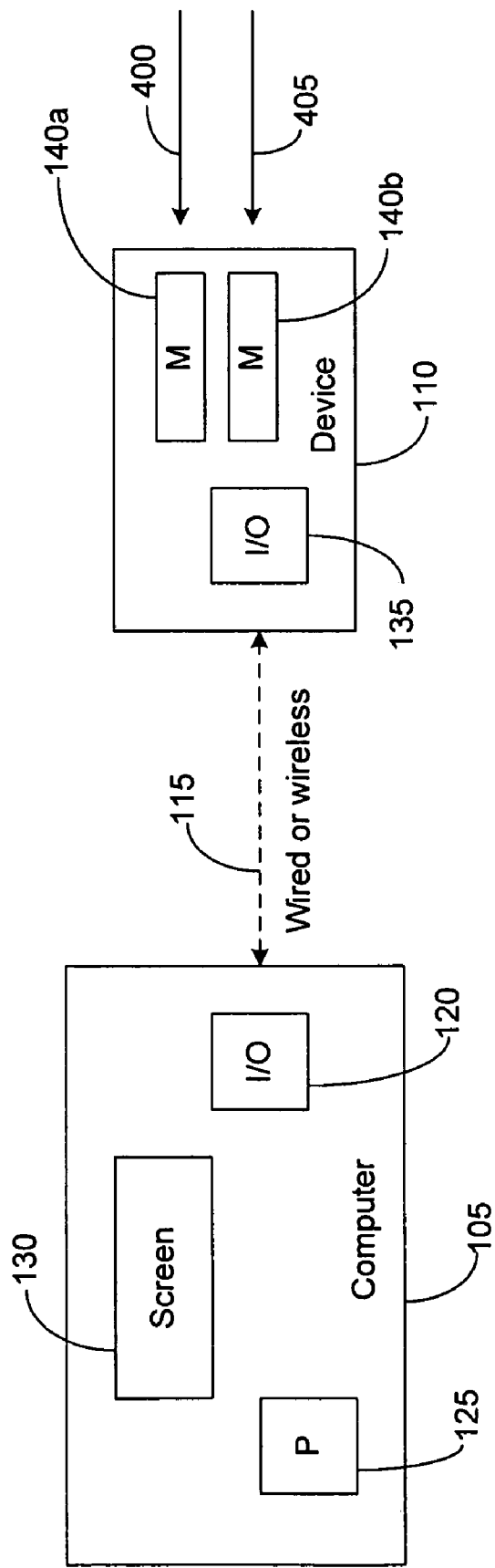
FIG. 4 is a block diagram of an apparatus in accordance with another embodiment of the invention.

As another example as shown in FIG. 4, the variable-function device 110 may be configured with multiple input modules 140a and 140b to permit multiple types of input-related functionalities. For example, the variable-function device 110 may be configured with multiple input modules to permit the variable-function device 110 to receive both manual user inputs 400 and wireless input commands 405 in order to permit the computer 105 to perform desired functions by use of the variable-function device 110. The number of input modules in the variable-function device 110 may vary. Thus, in one embodiment, the modules 140a and 140b can perform different input functionalities or/and similar input functionalities.

In one embodiment, a method of manufacturing the variable-function device 110 includes providing a module configured to provide a functionality. The variable-function device 110 is configurable to support a second module for providing an additional functionality. At least a second module can be included in or integrated with the variable-function device 110 in order expand the functionality of the device 110.

Figure 5:
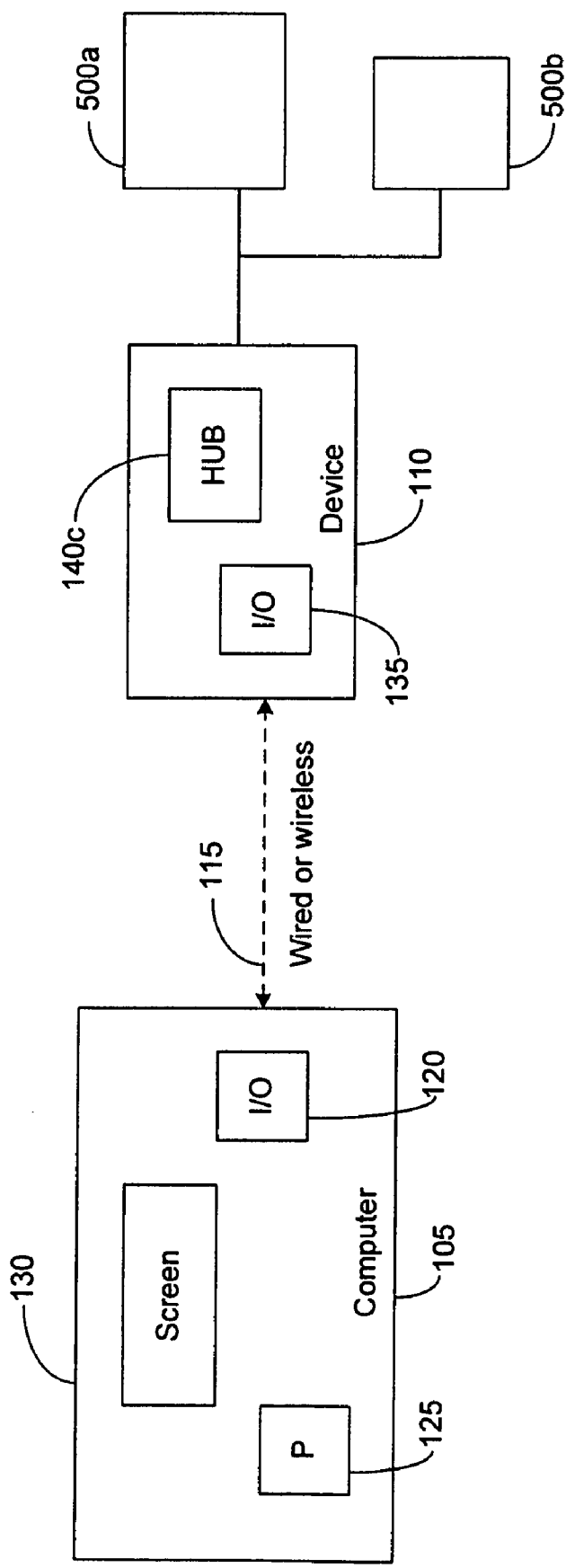
FIG. 5 is a block diagram of an apparatus in accordance with another embodiment of the invention.

As shown in FIG. 5, if, for example, the input-function module 140c includes a USB hub or another type of bus hub, then at least one device 500 (e.g., devices 500a and 500b) can be coupled to the input-function module 140c. The devices 500 may be, for example, key boards, mices, and/or other peripheral devices, and/or other suitable devices.

Figure 6:
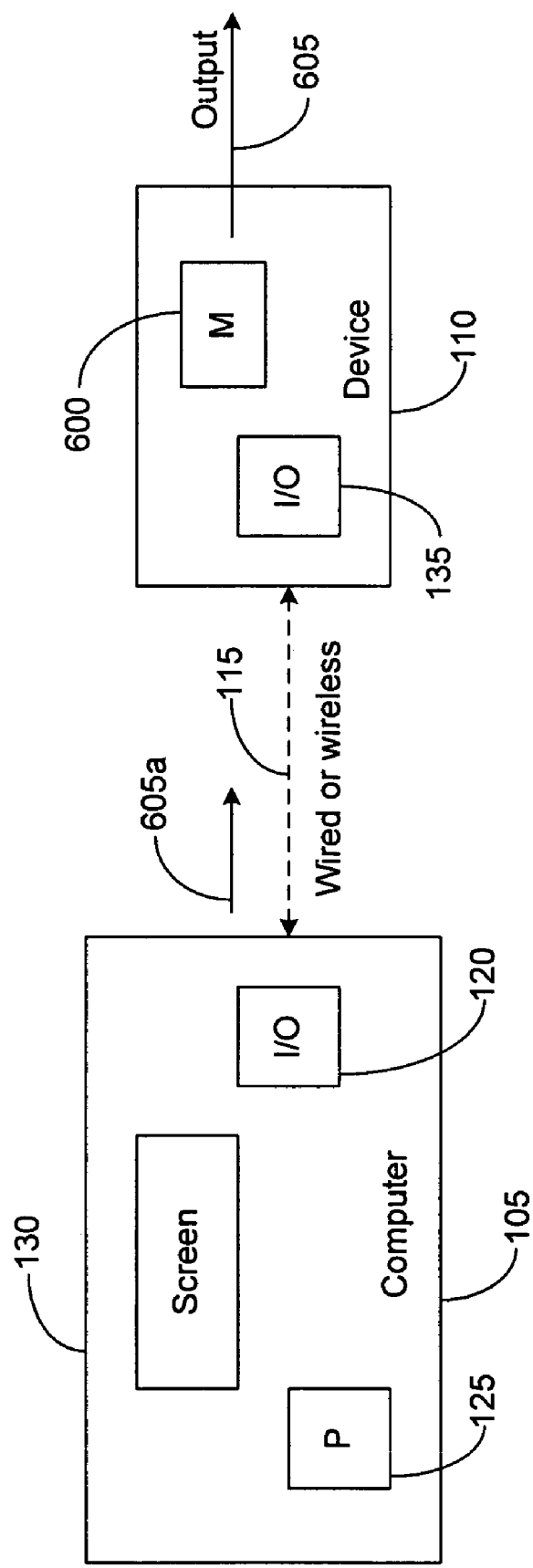
FIG. 6 is a block diagram of an apparatus in accordance with another embodiment of the invention.

FIG. 6 is a block diagram of a variable-function device 110 in accordance with another embodiment of the invention. The variable-function device 110 includes an output-function module 600 that can transmit an output 605 to a user (or to another device), where the output 605 may represent an output function (or output functionality) as described in detail below. A control signal (or control signal with data) 605a from the computer 105 is typically transmitted via communication link 115 and is processed by I/O interface 135. The output 605 is then generated by the output-function module 600 based upon the signal 605a from the computer 110. Examples of different types of outputs 605 from the output-function module 600 are described below.

As another example, an output 605 may be generated based on a signal provided by another device that can communicate with the variable-function device 110. One example of such another device is a device 1310 (FIG. 13) which can provide an input 1307 to permit an output-function module 600 to perform a particular output functionality.

Reference is again made to FIG. 6. Various known design schemes or methods for integrating a component in a device may be used to integrate or include an output-function module 600 in a variable-function device 110. An example of a suitable design scheme or method may be of the type used for manufacturing the product known as JORNADA from HEWLETT-PACKARD COMPANY.

Figure 7:
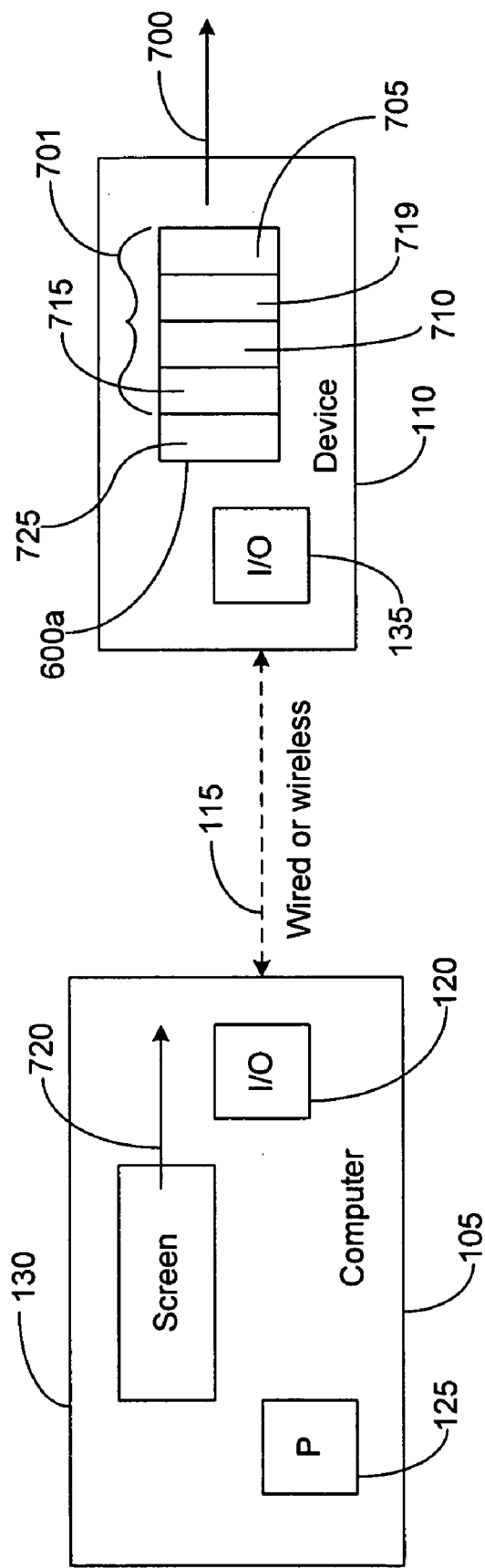
FIG. 7 is a block diagram of an apparatus in accordance with another embodiment of the invention.

As an example as shown in FIG. 7, the output-function module may be a module 600a to provide notifications (and/or warnings/alerts, video, pictures, photographs, images, advertisements, logos, and/or other output) 700 to a user by use of, for example, an output stage 701. The output stage 701 may be, for example, a display screen 705 to display an alert message, to show a picture, photograph, image, advertisement, video, logo (e.g., the HP logo), and/or to indicate other output 700. Alternatively or additionally, the output stage 701 may also include, for example, a light emitting element (e.g., LED) 710 that turns on to alert the user. In addition or alternatively, the notification 700 may be a sound or audio signal that is emitted from a sound emitting element 715 which may be, for example, a speaker. The sound emitting element 715 may be part of or may form the output stage 701. Alternatively or in addition, the output stage 701 may include a motion-actuating element 719 that triggers motions such as vibrations, movements of movable parts of the variable-function device 110, and/or other types of motions/movements as an output 700. Other types of output generating elements or methods may be used by the output stage 701. An output interface 725 may process the output 700 before being shown via the output stage 701. In one embodiment, a content, image, or program 720 being shown by the computer screen 130 is not interrupted or disturbed by a notification or alert message that current devices show on the screen 130. An embodiment of the invention will show or otherwise indicate this notification or alert message as output 700 via output stage 701.

Figure 8:
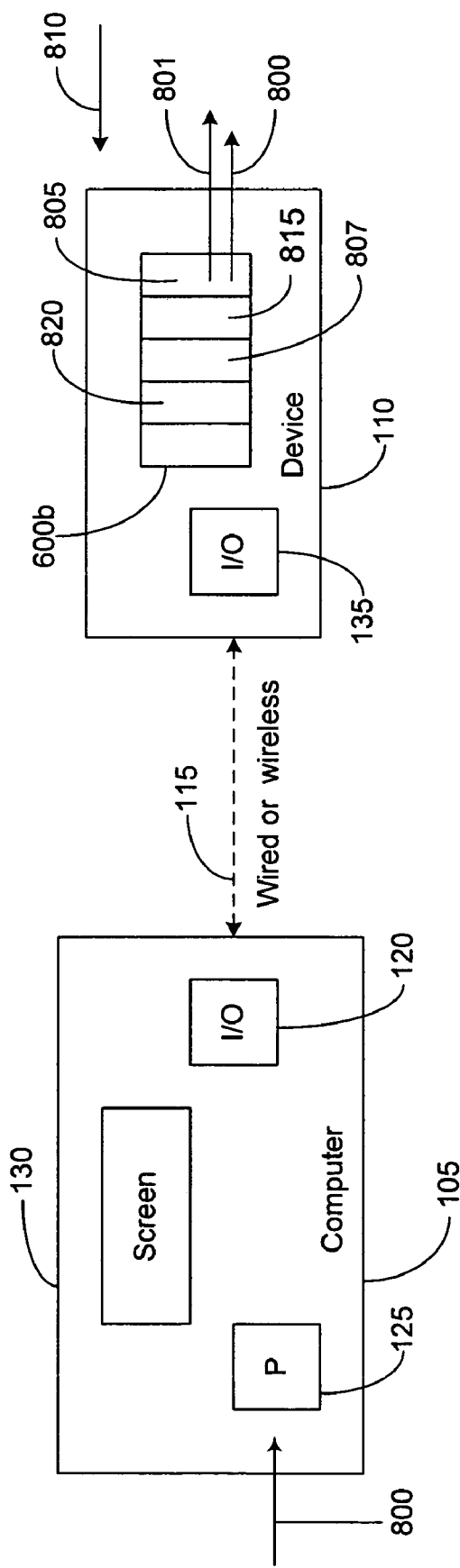
FIG. 8 is a block diagram of an apparatus in accordance with another embodiment of the invention.

As another example as shown in FIG. 8, if an e-mail or instant message 800 is received by the computer 105, then the processor 125 will forward the e-mail or instant message 800 and an e-mail or instant message arrival notification 801 to the variable-function device 110 via communication link 115. An e-mail or instant message arrival notification 801 can be output by output stage 805 of output-function module 600b. As similarly described above, the output stage 805 may include, for example, a screen for displaying the notification 801 and/or the e-mail or instant message 800, a light emitting element for indicating a message arrival 801, a speaker or other sound-emitting element for indicating a message arrival 801, a motion actuation element for indicating a message arrival 801, and/or other types of elements capable of indicating a message arrival 801. In one embodiment, the module 600b may include a text-to-speech module 807 for converting the text of the e-mail message or instant message into speech sounds.

In embodiments where the variable-function device 110 can receive input commands from a user, the user may provide an input 810 to the variable notification device 110 to permit the text and/or attachment(s) of the e-mail message to be displayed (or converted into speech sounds in one embodiment). In one embodiment, the module 600b may include an e-mail engine (and/or e-mail client) 815 (and/or an instant messaging engine) to permit processing of the e-mail or instant message. The module 600b may also include a processor to permit the processing and display of the text and/or attachment(s) of the e-mail message.

Figure 9:
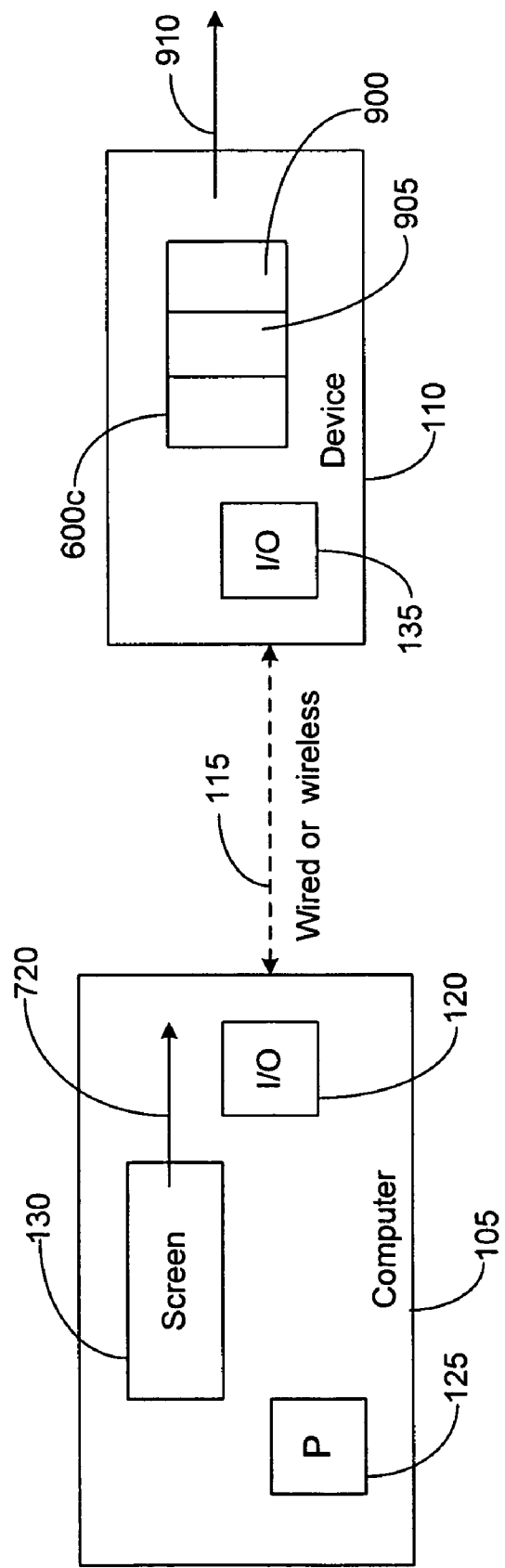
FIG. 9 is a block diagram of an apparatus in accordance with another embodiment of the invention.

As another example as shown in FIG. 9, the variable-function device 110 may include an output-function module 600c that includes a display screen 900 (or/and other types of displays 905 such as, for example, an LED array). The screen 900 or display 905 may, for example, entertainment-related information 910 such as the name of a compact disc or movie that is being processed by the computer 105 and/or the like. Alternatively or additionally, in one embodiment the display 900 includes a speaker for indicating the entertainment-related information 901 in speech form. Thus, an embodiment of the invention provides a variable number of types of information or content that can be output by variable-function device 110.

Figure 10:
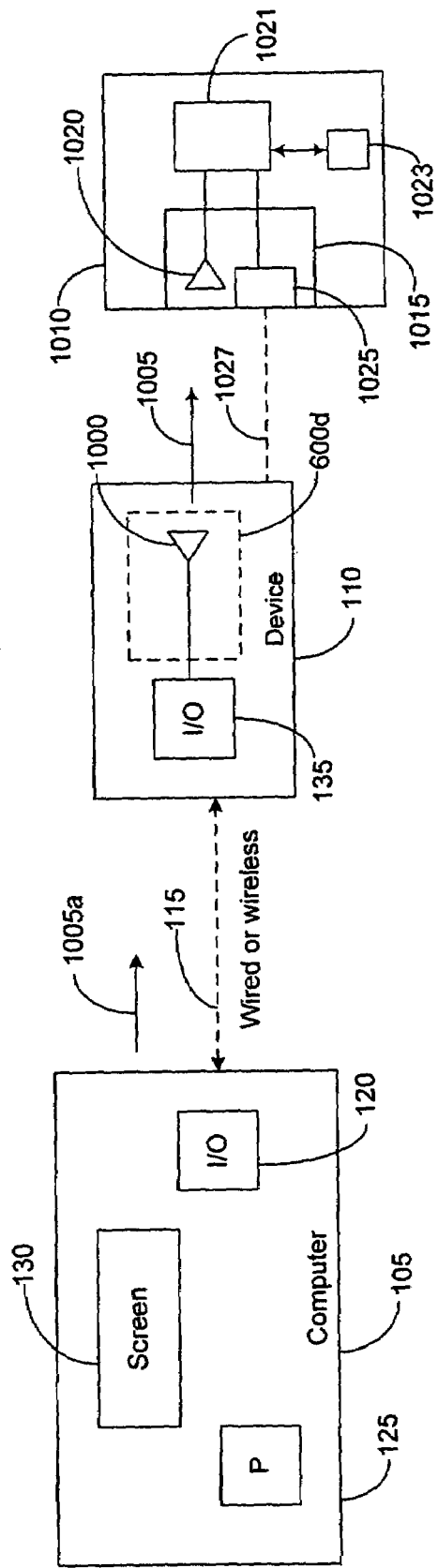
FIG. 10 is a block diagram of an apparatus in accordance with another embodiment of the invention.

As another example as shown in FIG. 10, an output-function module 600d may include a transmitter (or transceiver) 1000 that can transmit a wireless output signal(s) 1005 to a device 1010 such as remote control device, speaker, network node, a camera monitor, another computer, and/or other types of devices. An input signal 1005a from the computer 105 is received via communication link 115 and processed by the I/O interface 135. Based on the input signal 1005a, the transmitter (or transceiver) 1000 generates an output 1005 to a device 1010. Of course, the output 1005 may be generated in response to other signals that are received by the variable-function device 110, where the other signals may be generated by other devices that can communicate with the variable-function device 110.

The device 1010 may include, for example, an output interface 1015 and a destination stage 1021 for receiving the output 1005 of the variable-function device 110 and generating an event (or permitting a function) in response to the output 1005. For example, the destination stage 1021 may generate via output stage 1023 an output such as alerts, notifications, texts, images, audio or video output, LED or light emissions, motion outputs, and/or other types of output. The interface 1015 may include, for example, a receiver (or transceiver) 1020 for receiving wireless signals, a signal interface 1025 (for receiving signals in implementations with the optional wired or bus link 1027), and/or other suitable components to permit the reception of the output 1005.

The output signal 1005 may be, for example, infrared signals, RF signals, or other wireless commands or signals. The transmitter (transceiver) 1000 may also be configured to transmit other frequencies of the electromagnetic spectrum such as, for example, Ultrahigh Frequency (UHF), Very High Frequency (VHF), microwave, or other frequencies. The output signals 1005 may also be wire-transmitted signals if an optional wired or bus link 1027 is implemented between the variable-function device 110 and the device 1010.

Figure 11:
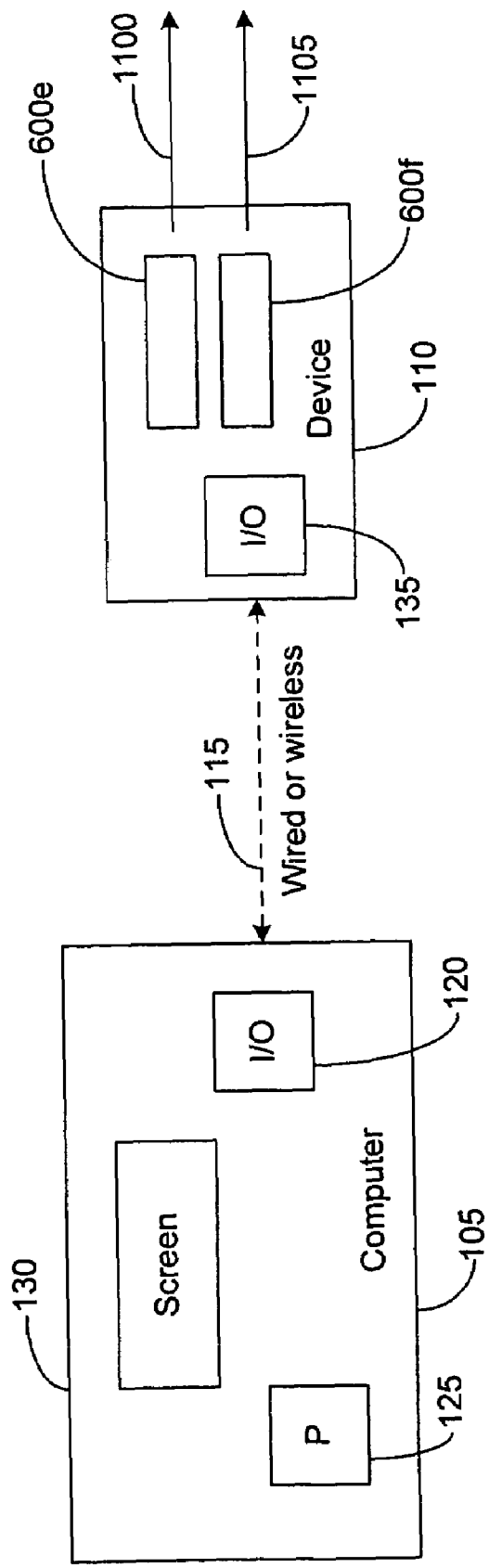
FIG. 11 is a block diagram of an apparatus in accordance with another embodiment of the invention.

In another embodiment as shown in FIG. 11, the variable-function device 110 may be configured with multiple output-function modules. For example, the variable-function device 110 may be configured with multiple output-function modules 600e and 600f to permit the variable-function device 110 to transmit, for example, both a displayed output 1100 to a user and wireless output commands 1105 to a device (e.g., device 1010 in FIG. 10). The number of output-function modules 600 in the variable-function device 110 may vary.

Other types of output-function modules 600 that can be supported in the variable-function device may include, but not limited to, for example, an I/R blaster, speaker, status display (e.g., in liquid crystal display (LCD) or vacuum florescent), USB hub or other bus hubs, an Ethernet or LAN connection, light-emitting elements, sound-emitting stages, other notification or alert devices, a motion-enabling stage for causing a vibration or other motions to alert a user, a clock, an alarm clock, a display for showing pictures, and/or other types of modules that permit particular functions. The different types of output-function modules 600 may be included or integrated in the variable-function device 110 to permit a variable number of output-related functions to be supported by the variable-function device 110.

Figure 12A:
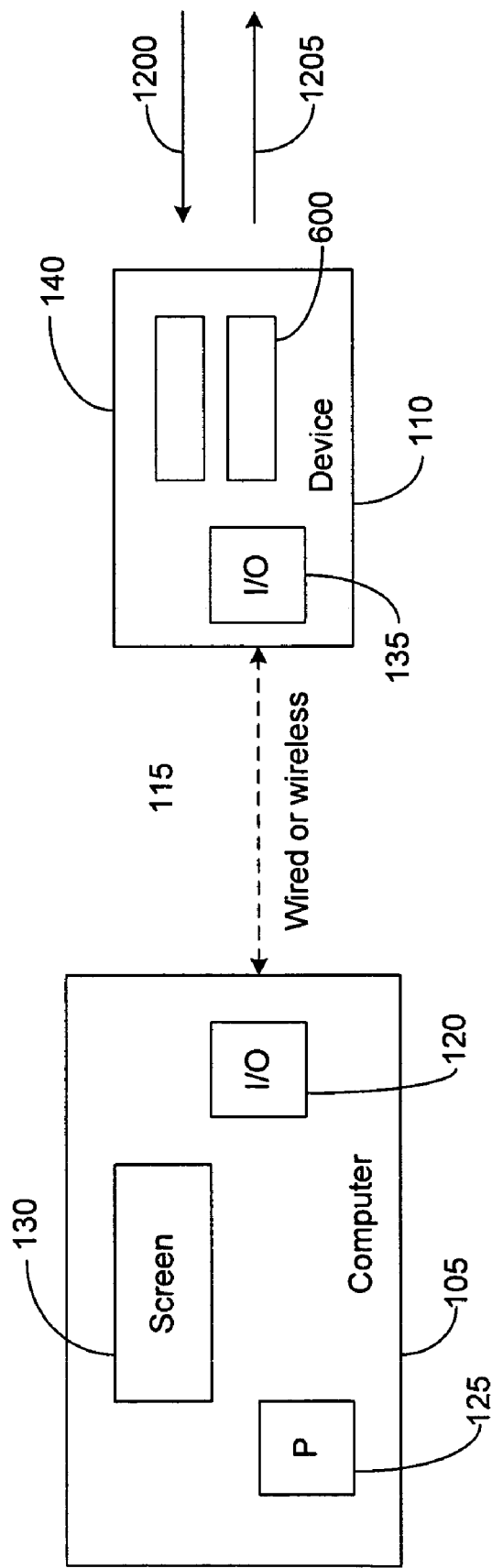
FIG. 12A is a block diagram of an apparatus in accordance with another embodiment of the invention.

FIG. 12A is a block diagram of a variable-function device 110 in accordance with another embodiment of the invention. The variable-function device 110 includes an input-function module 140 to permit input-related functions based on input 1200 and output-related functions as represented by output 1205. The number of input-function modules 140 and output-function modules 600 may vary to permit the variable-function device 110 to have a variable number of functions.

Figure 12B:
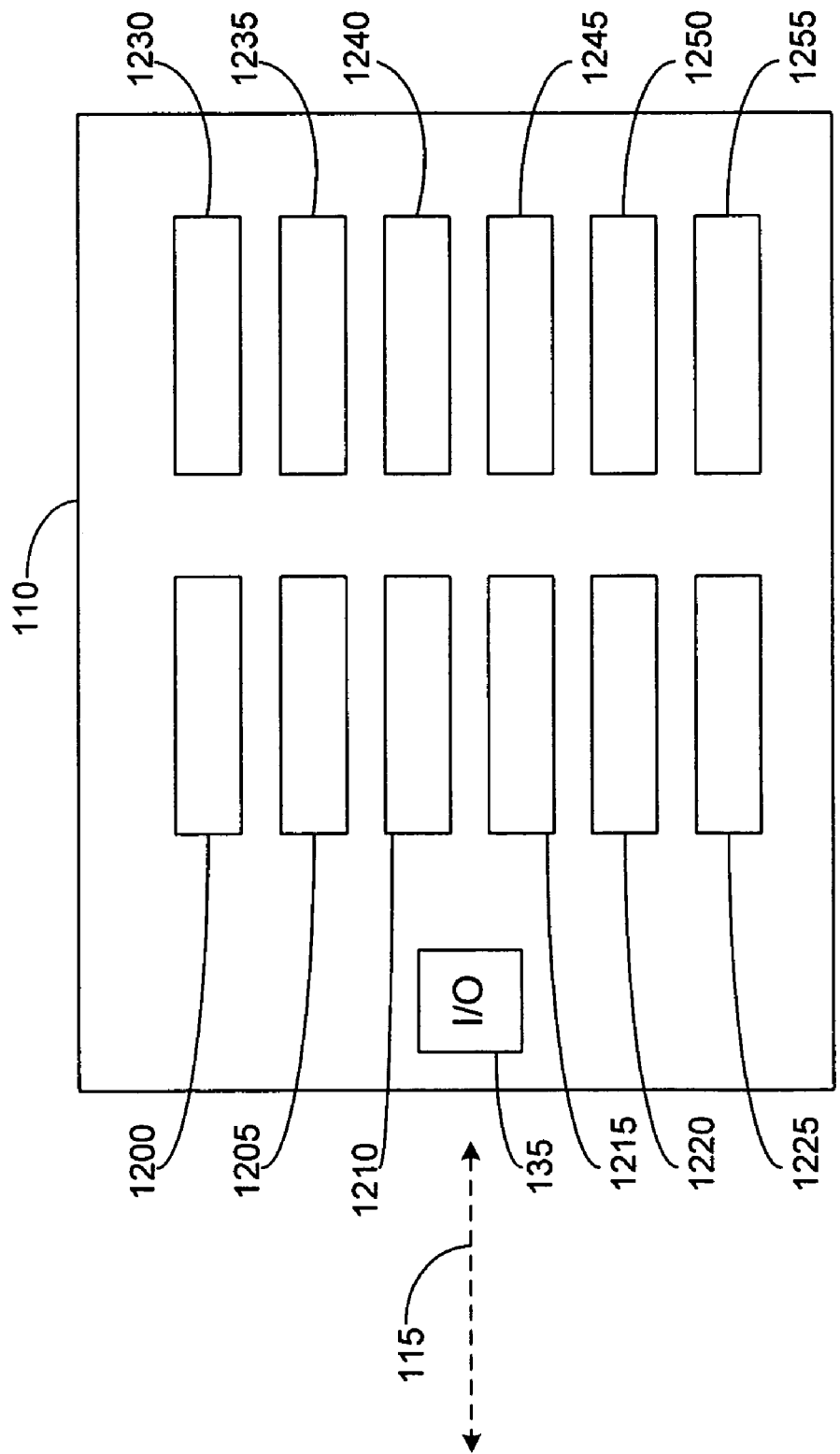
FIG. 12B is a block diagram of an apparatus in accordance with another embodiment of the invention.

FIG. 12B is a block diagram of a variable-function device 110 in accordance with another embodiment of the invention. In this embodiment, the variable-function device 110 may include at least one of the function modules 1200, 1205, 1210, 1215, 1220, 1225, 1230, 1235, and 1240. There are numerous possible combinations of function modules in FIG. 12B that can be included in or integrated with the variable-function device 110. Tables 1 through 12 below list possible functionalities for a particular one of the function modules in FIG. 12B.

The module 1200 may provide entertainment and/or information-resource related functions. The module 1200 may provide, for example, at least one of the functions listed in Table 1.

TABLE 1 possible functions for module 1200

- games
- eCheat ™ (or other similar Internet Resources)
- Gameboy Advance ™
- dynamic gamepad (with or without force feedback)
- ePet ™ (or other similar Internet Resource)
- eLavaLamp ™
- logos (e.g., HP ® logo)
- animated and/or non-animated screensavers
- other functions The module 1205 may provide home security and/or data security related functions. The module 1205 may provide, for example, at least one of the functions listed in Table 2.

TABLE 2 possible functions for module 1205

- intruder alert or burglar alarm
- virus detector
- firewall penetration
- police scanner
- biometrics (e.g., fingerprint recognition)
- baby monitor
- X10 ™ control
- private data
- other functions The module 1210 may provide system display and/or system control related functions. The system may be part of, for example, a computer 105 (or another upstream device) that can communicate with the variable-function device 110. The module 1210 may provide, for example, at least one of the functions listed in Table 3.

TABLE 3 possible functions for module 1210

- central processing unit (CPU) utilization or "power meter"
- turn system on and/or off
- mimic display of any connected peripheral (e.g., inkjet printer)
- connection speed
- HP e-helper ™
- diagnostics and/or help
- OOBE helper
- color calibration
- simple input device or user interface for (UI) for children
- system status (e.g., Standby, Shutting Down)
- other functions The module 1215 may provide telephony related functions. The module 1215 may provide, for example, at least one of the functions listed in Table 4.

TABLE 4 possible functions for module 1215

- Caller identification (ID) (may have, e.g., audible feature or intelligence/smart feature)
- answering machine
- intercom
- speaker phone (e.g., conference speakerphone or Internet speakerphone)

TABLE 4-continued possible functions for module 1215

- phone (e.g., cell phone, portable phone, phone with handset or headset)
- other functions The module 1220 may provide messaging related functions and/or communication related functions. The module 1220 may provide, for example, at least one of the functions listed in Table 5.

TABLE 5 possible functions for module 1220

- instant messenger and/or buddy-list (see also FIG. 8)
- "find-my-friend" application and/or alert
- electronic mail (see also FIG. 8)
- other functions The module 1225 may provide alert related functions and/or notification related functions. The module 1225 may provide, for example, at least one of the functions listed in Table 6.

TABLE 6 possible functions for module 1225

- alarms, text notifications, audio notification, and/or other types of notifications (see also FIG. 7)
- "You've got mail . . . " email notification (see also FIG. 8)
- backWeb messages and/or ads
- reminders (e.g., Valentine's Day upcoming)
- notes and/or scratchpads
- behavior monitoring (of user)
- repetitive strain injury (RSI) warning
- other functions The module 1230 may provide productivity related functions, such as, for example, home productivity functions and/or office productivity functions. The module 1230 may provide, for example, at least one of the functions listed in Table 7.

TABLE 7 possible functions for module 1230

- calendar and/or agenda
- to-do List and/or manager
- office finance and/or home finance (may interface with finance software such as, for example, Quicken ™, Quickbooks ™, Timeslips ™, and/or other finance related software)
- calculator
- rolodex and/or contacts
- recipes
- calorie counter
- exercise program
- dictionary and/or thesaurus
- other functions The module 1235 may provide transaction-related functions and/or value-added services. The module 1235 may provide, for example, at least one of the functions listed in Table 8.

TABLE 8

| possible functions for module 1235 |
| --- |
| coupon offerings |
| travel specials |
| good deal (shopping) alert |
| Web services |
| recommendations |
| language translator |
| other functions |

The module 1240 may provide functions related to a logical window for a personal computer or other computer such as, for example, the PAVILION™ computer from HEWLETT-PACKARD COMPANY. The module 1240 may provide, for example, at least one of the functions listed in Table 9.

TABLE 9

| possible functions for module 1240 |
| --- |
| Module 1240 may provide another logical window, where activity is tracked on a primary display (for example, module 1240 can show information, while the primary display is showing Windows; and/or module 1240 may show PC/Computer/Windows information while the primary display is immersed in other information). |
| Module 1240 may also provide a "dual head" display feature and/or Picture-in-Picture feature) |
| Module 1240 may provide a virtual second monitor (which may or may not be independent of Windows) |
| other functions |

The module 1245 may provide educational related functions. The module 1245 may provide, for example, at least one of the functions listed in Table 10.

TABLE 10

| possible functions for module 1245 |
| --- |
| distance learning |
| homework helper |
| school (e.g., University) calendar |
| school (e.g., University) class schedule |
| other functions |

The module 1250 may provide audio and/or visual (A/V) related functions and/or functions related to device control. The module 1250 may provide, for example, at least one of the functions listed in Table 11.

TABLE 11

| possible functions for module 1250 |
| --- |
| display "Now Playing:" information (e.g., display information about currently playing compact disc (CD), digital video disc (DVD), AM/FM program, television program, and/or other media) |
| display "Now Recording:" information (e.g., information about a program, song, and/or other media being recorded) |
| photos and/or digital picture frame |
| audio status and/or control |
| TV guide and/or Electronic Program Guide (EPG) (may have, for example, scrolling feature) |

TABLE 11-continued

| possible functions for module 1250 |
| --- |
| audio-in and/or headphones out |
| standard A/V display information |
| speaker calibration |
| Karaoke information |
| equalizer |
| music playlist |
| television Picture-In-Picture (PIP) feature, picture overlay feature, and/or split screen feature |
| album and/or compact disc covers |
| other functions |

The module 1255 may provide advanced functions. The module 1255 may provide, for example, at least one of the functions listed in Table 12.

TABLE 12

| possible functions for module 1255 |
| --- |
| Web camera |
| MP3 player |
| digital camera and/or video recorder |
| card reader |
| Global Positioning System (GPS) |
| heart monitor |
| night light |
| voice recorder |
| ZIP replacement |
| smart card reader, a memory card reader, and/or credit card reader |
| Breathalyzer |
| lie detector |
| motion detector |
| CapShare |
| Richter meter and/or earthquake detector |
| Biofeedback |
| other functions |

Other types of function modules that can be supported in an embodiment of the variable-function device 110 may include, but not limited to, for example, media transport control buttons, a USB hub or other bus hubs, a removable storage device, an Ethernet or LAN connection, and/or other types of elements or features that permit particular functions.

Figure 13:
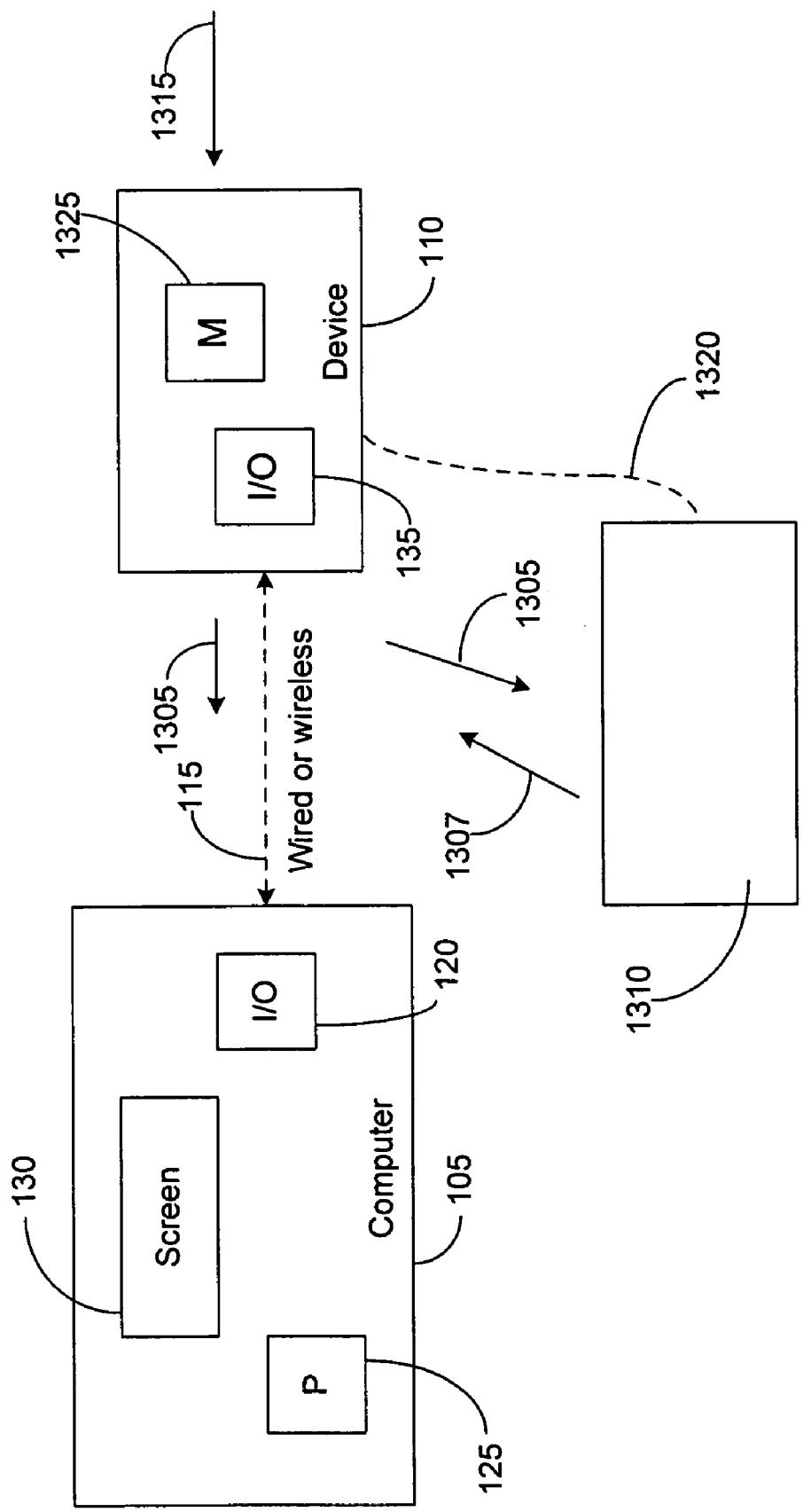
FIG. 13 is a block diagram of an apparatus in accordance with another embodiment of the invention.

FIG. 13 is a block diagram of a variable-function device 110 in accordance with another embodiment of the invention. The variable function device 110 is configured to transmit signals 1305 to the computer 105. In addition or alternatively, the variable-function device 110 is configured to transmit the signals 1305 to a receiving device 1310 to permit particular functions to be performed by the device 1310 (e.g., an upstream device). For example, in response to a manual or wireless input 1315 to the variable-input device 110, the variable-function device 110 may transmit a wireless signal (e.g., an infrared command signal) 1305 to the device 1310 so that the device 1310 can perform a particular operation and/or an event is triggered in the device 1310. The signal 1305 may also be transmitted to the device 1310 via an optional wired link 1320. For example, the device 1310 may be a television or stereo that turns on in response to a particular infrared command signal 1305. As another example, the device 1310 may be a home automation server that permits particular home automation functions to be performed in response to the signal 1305. As noted above, the variable-function device 110 can also receive input signals 1307 from the device 1310 to, for example, trigger an event and/or operation by the module 1325 in the variable-function device 110.

Figure 14:
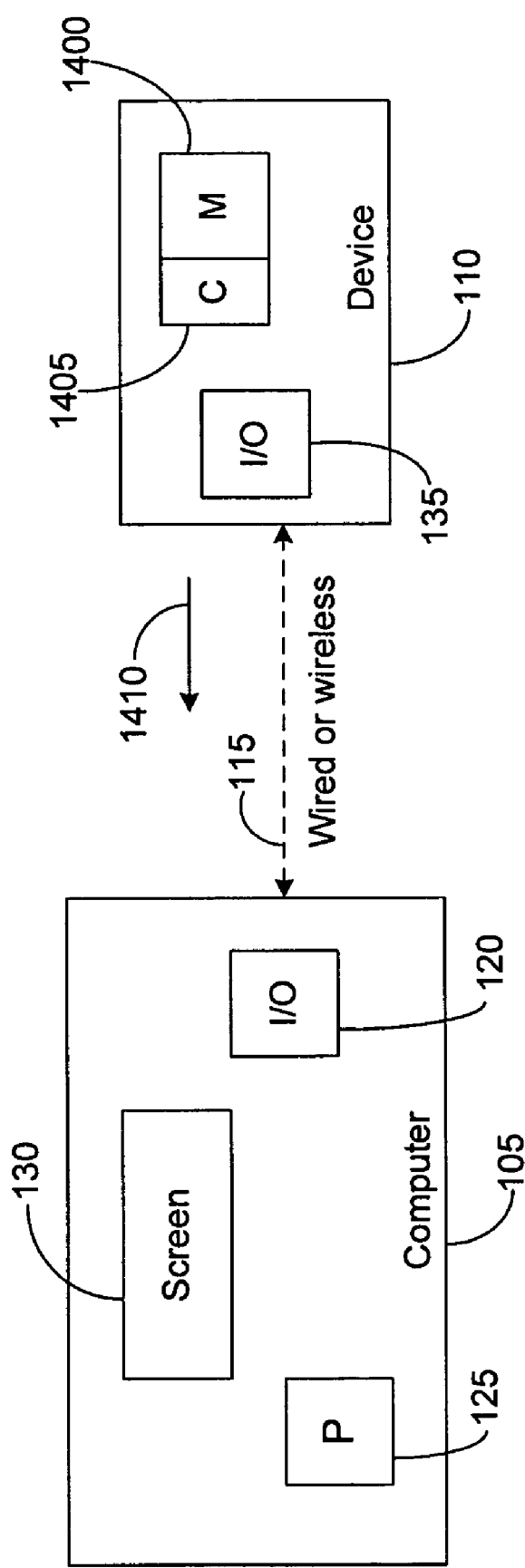
FIG. 14 is a block diagram of an apparatus in accordance with another embodiment of the invention.

FIG. 14 is a block diagram of a variable-function device 110 in accordance with another embodiment of the invention. The variable function device 110 may include a module 1400 for alerting or triggering the computer 105 to perform particular functions at, for example, a scheduled time. In one embodiment, the module 1400 includes a clock 1405 to permit the module 1400 to generate an event triggering signal 1410 to turn on the computer 105 and permit the computer 105 to perform, for example, a scheduled event. In one particular instance, the computer 105 may be switched from an off-state into an on-state in response to the event triggering signal 1410.

Figure 15:
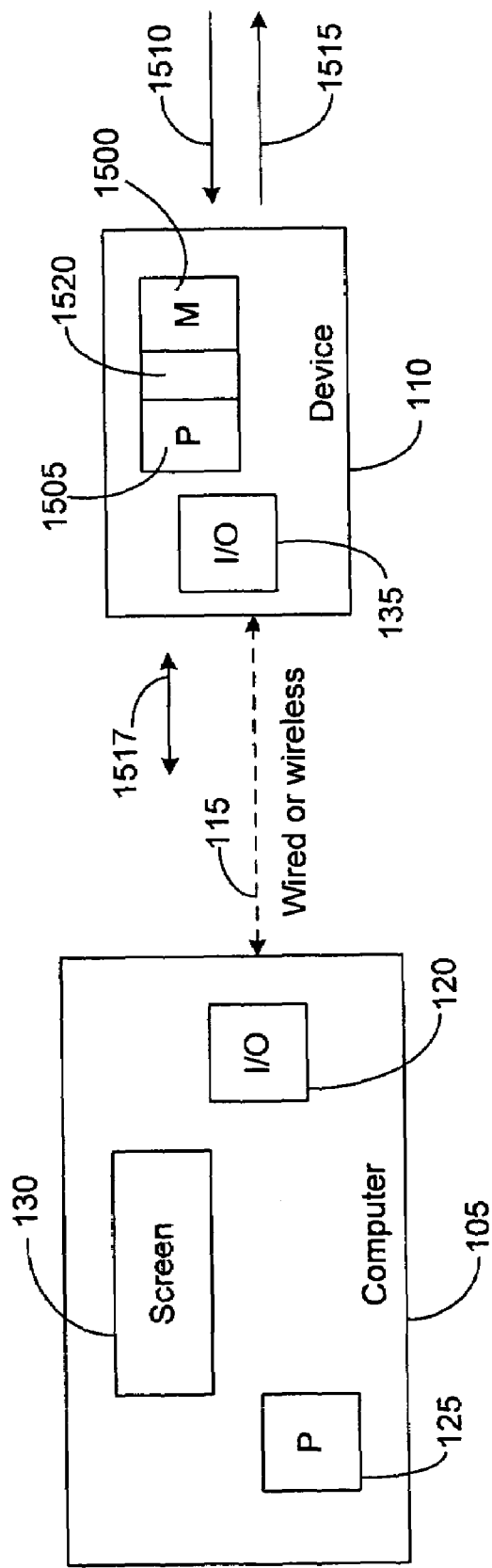
FIG. 15 is a block diagram of an apparatus in accordance with another embodiment of the invention.

FIG. 15 is a block diagram of a variable-function device in accordance with another embodiment of the invention. The variable function device 110 may include a module 1500 that includes a processor 1505. This processor 1505, for example, performs processing tasks to enable some input-related tasks (or functions) 1510 and/or output-related tasks (or functions) 1515 and/or functions 1517 related to a device (e.g., computer 105) that can communicate with the variable-function device 110. Alternatively or additionally, the processor 1505 may perform some processing functions that can be performed by the processor 125 in the computer 105. Thus, the variable-function device 110 permits at least some processing functions to be shifted from the computer 105 to the variable-function device 110.

The processor 1505 may be embodied as, for example, a micro-controller, microprocessor, digital signal processor (DSP), Application Specific Integrated Circuit (ASIC), programmable logic device (PLD), field programmable gate array (FPGA), or other suitable devices.

The module 1500 in the variable-function device may also include a memory (storage element) 1520 that can store various software or firmware. For example, the software may be an operating system or an executable program for an application such as electronic mail or web browser. The firmware provides instructions to the processor 1500 for certain functions so that the processor 1500 can launch certain programs or perform other functions independently of the computer 105.

Figure 16:
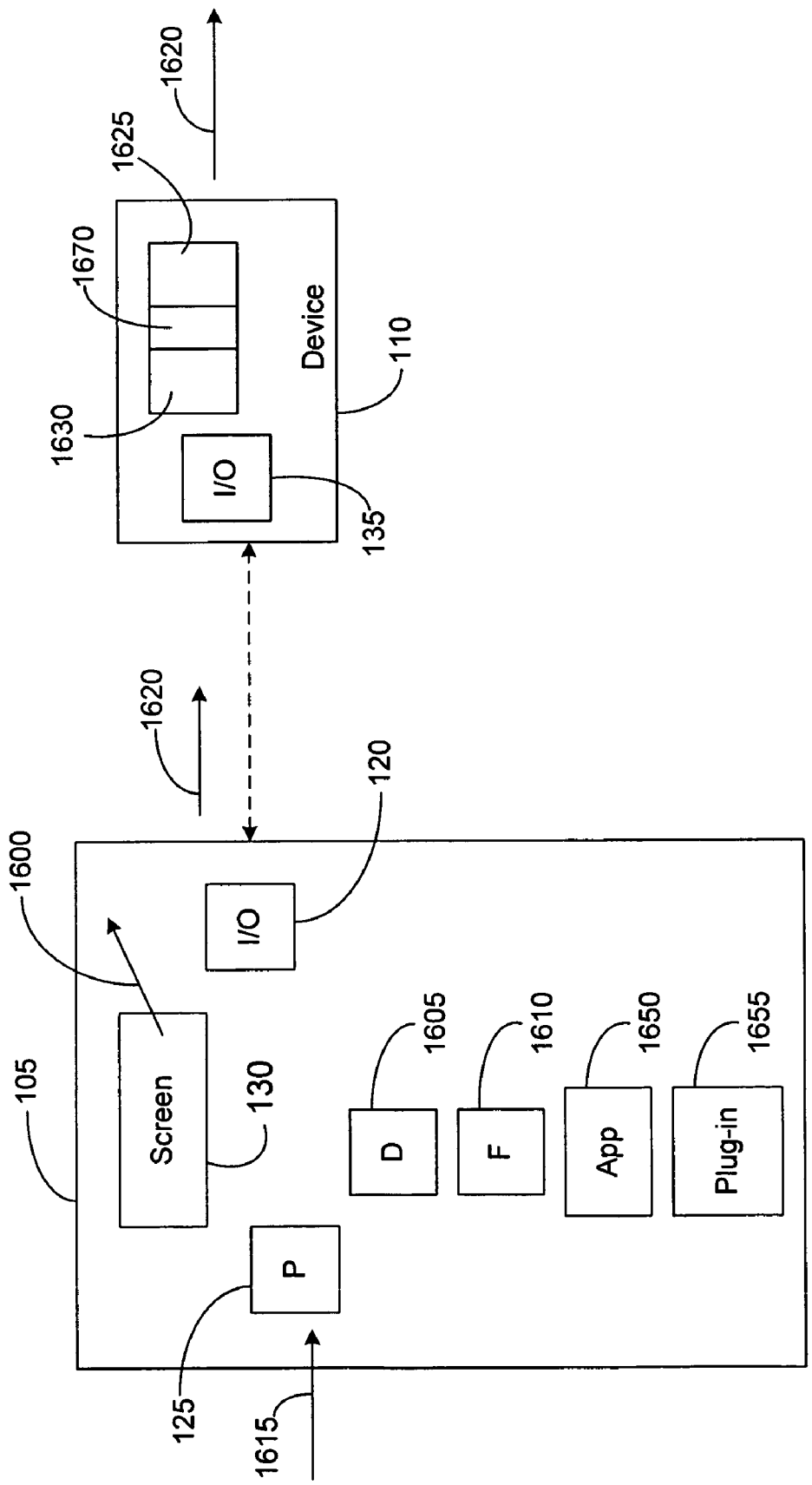
FIG. 16 is a block diagram of an apparatus in accordance with another embodiment of the invention.

FIG. 16 is a block diagram of a variable-function device 110 in accordance with another embodiment of the invention. Assume that the screen 130 of the computer 105 is displaying content 1600 that the user does not want to be interrupted. For example, the content 1600 may be a movie or an output of a program being executed by the computer processor 125. A device driver 1605 and filter software 1610 may be programmed to detect for particular events so that when these particular events 1615 occur, then a content 1620 related to these events (event-related content 1620) is instead transmitted by the device driver 1605 via communication network 115 and generated by an output stage 1625 of a module 1630 of the variable-function device 110. Depending on the elements that form the output stage 1625 (e.g., display screen, speakers, light-emitting elements, and/or the like), the content 1620 may be made observable to the user as, for example, an image, video, text, audio sound, motion, light emission, and/or other types of output. Therefore, an embodiment of the invention prevents the interruption of content 1600 that is being shown in the computer screen 130.

The event 1615 may be, for example, a notification indicating the arrival of electronic mail or instant message, low-battery power alert, and/or other events that may be detected for by the device driver 1605 and filter software 1610. The filter software 1610 performs a comparison between preset data (that represent particular events) and the event signal 1615 to determine if content representing the event 1615 should be displayed in the variable-function device 110.

Various known methods may be used to permit the output stage 1625 of the module 1630 to generate the event-related content 1620. For example, the filter software 1620 may be code that is in between a driver for the display screen 130 and the application(s) 1650 that sends content to the screen 130. The filter software 1610 may, for example, allow a user to designate the application content that should be generated via the output stage 1625 of the module 1630 in the variable function device 110, instead of generating the application content via the computer screen 130. Thus, the filter software 1610 may allow a user to customize the content shown via the output stage 1625 of the module 1630. Alternatively, the filter software 1610 may have default settings that will cause a particular application content to be generated via the output stage 1625 of the module 1630. Alternatively, the filter software 1610 may allow a particular application content to be generated via the computer screen 130 and the output stage 1625.

Alternatively or additionally, a plug-in 1655 may be used at the application level to allow an application content to be generated via the output stage 1625 of the module 1630 instead of the computer screen 130. The plug-in 1655 may also allow an application content to be generated via the output stage 1625 and the computer screen 130.

Alternatively, as part of a software 1670 in the module 1630 in the variable-function device 110, an application program interface (API) can permit application vendors to program an application content to by-pass the computer screen 130, so that the application content is generated via the output stage 1625 of the module 1630. In this particular implementation, the filtering software 1610 may be omitted when generating application content via the output stage 1625 of the module 1630.

Figure 17:
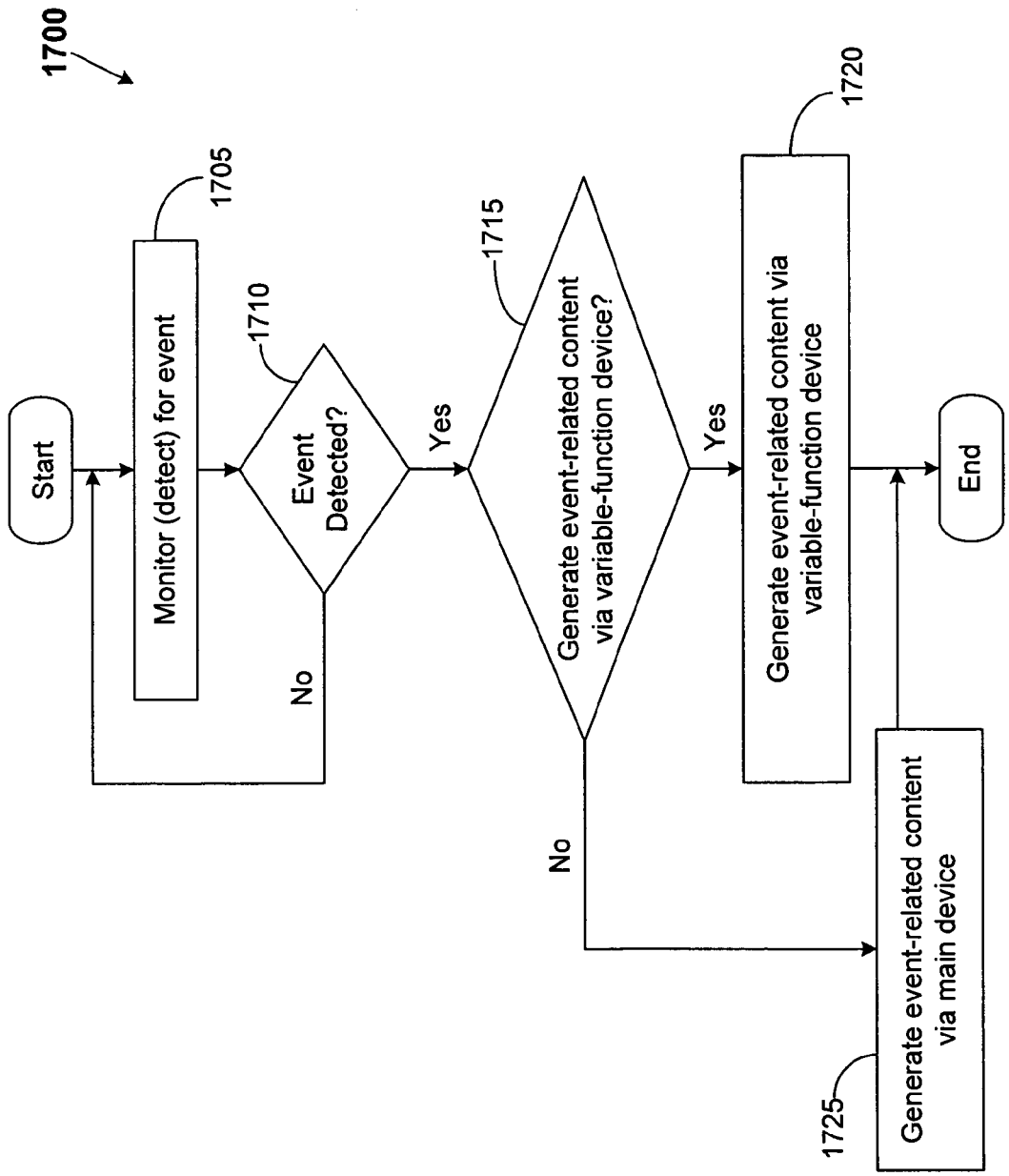
FIG. 17 is a flow diagram of an apparatus in accordance with an embodiment of the invention.

FIG. 17 is a flow diagram of a method 1700 for generating an event-event related content by use of a variable-function device, in accordance with an embodiment of the invention. The method 1700 may run continuously or at representative intervals. Monitoring (1705) for an event is first performed. Upon a detection (1710) of an event, a determination is made (1715) if a content related to the event (event-related content) should be generated via an output stage of the variable-function device. If so, the event-related content is generated (1720) via the output stage. The event-related content may be output as, for example, an image, a notification, an audio sound, and/or another type of output. Otherwise, in step (1715), the event-related content is generated (1725) via an output stage of the main device (e.g., a screen of a computer).

In another embodiment, if a determination is made (1715) that the event-related content should be generated via the output stage of the variable-function device, then the event-related content may be generated via the output stage of the variable-function device and via the output stage of the main device (e.g., the screen of the computer).

Figure 18:
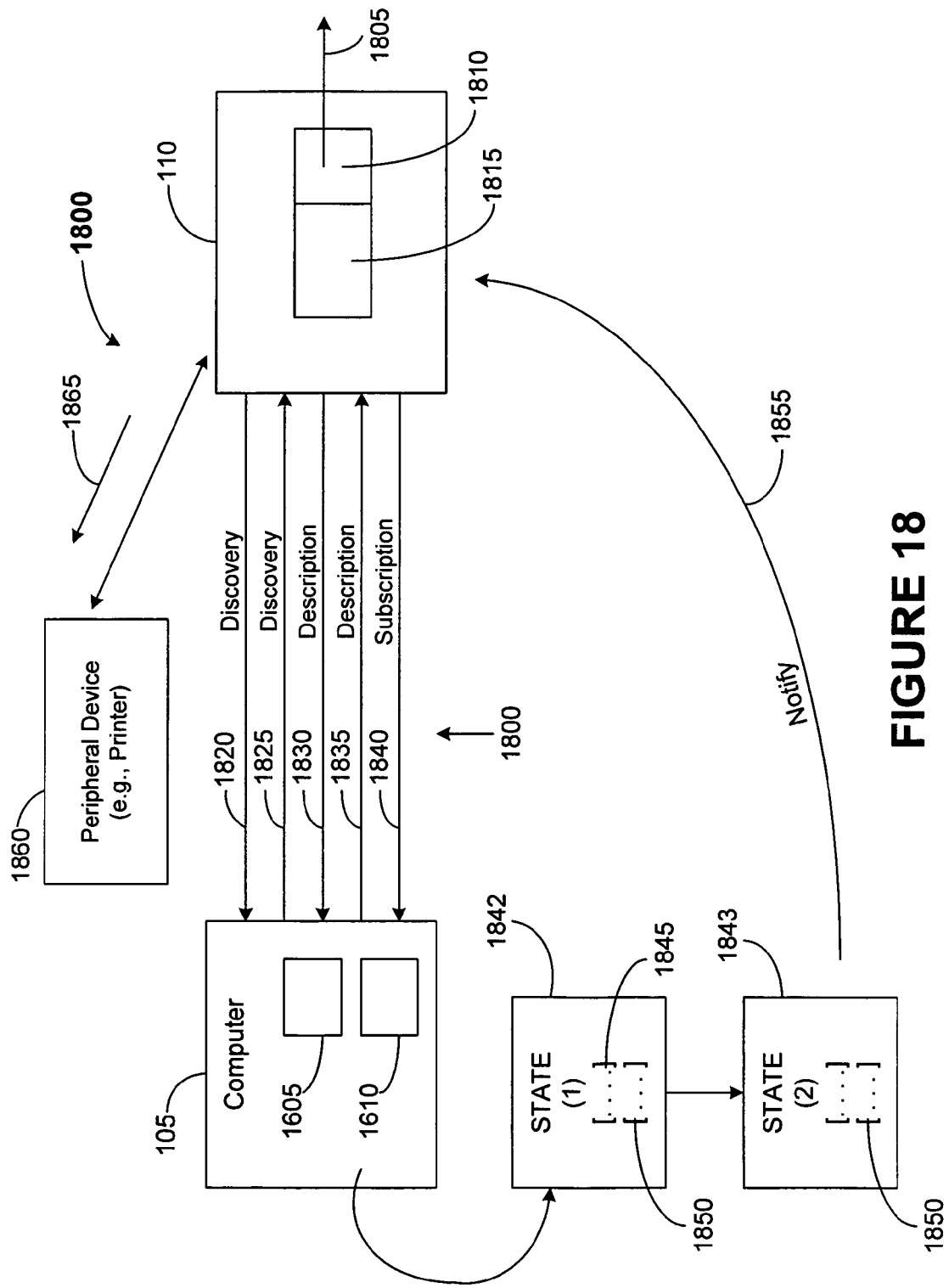
FIG. 18 is a block diagram of an apparatus in accordance with another embodiment of the invention.

In another embodiment as shown in FIG. 18, the computer 105 and variable-function device 110 may be connected to a network 1800 and may use the Universal Plug and Play (UPnP) standard. UPnP is a standard that uses Internet and Web protocols to enable devices such as PCs, peripherals, intelligent appliances, and wireless devices to be plugged into a network and automatically know about each other. With UPnP, when a user plugs a device into the network, the device will configure itself, acquire an Internet Protocol (IP) address, and use a discovery protocol based on the Internet's Hypertext Transfer Protocol (HTTP) to announce its presence on the network to other devices. Thus, an event occurrence can be handled by the eventing mechanism of UPnP. The device driver 1605 and filtering software 1610 can then determine if the announced event requires filtering. If so, then the event-related content is transmitted via network 1800 to the variable-function device 110 to permit the generation of an output 1805 (e.g., display image and/or audio alert) via output stage 1810 of the module 1815. The output 1805 may be the event-related content or information indicating a state change of a device connected to the network 1800.

As noted above, a first phase in the UPnP standard is the addressing phase, where, typically, a device that is added to the network 1800 will try to locate a Dynamic Host Configuration Protocol (DHCP) server on the network 1800 in order to acquire an IP address. After the addressing phase, a discovery phase occurs where the added device will broadcast its existence to the network 1800 by use of, for example, a multi-cast version of the Hypertext Transfer Protocol (HTTP) and attempt to obtain information about other devices in the network 1800. In FIG. 18, during a discovery phase, the variable-function device 100 sends a broadcast 1820, while the computer 105 sends a broadcast 1825.

After the discovery phase, a description phase occurs where a device in the network 1800 can learn about other devices based upon the descriptions of the devices. A description typically includes a state vector that describes the state of the device. In FIG. 18, the variable-function device 110 sends a request 1830 to the computer 105 for a device description, and, in response to the request, the computer sends the device description 1835 to the variable-function device 110. The device description 1835 includes information about the computer 105 and state information 1842 with a state vector 1845 describing the state of the computer 105. The variable-function device 110 can send a signal 1840 to subscribe to events that change a state of the computer 105, and this subscription is indicated in the representation 1850 which identifies all subscribing devices. The state information 1842 may be stored in, for example, an internal or external memory of the computer 105 or in other suitable locations such as a website.

It is further noted that the device description 1835 of the computer 105 may include hooks for controlling the computer 105. The device description 1835 permits the computer 105 to inform the variable-function device 110 on how the variable-function device 110 can control the computer 105. A standard mechanism to permit control of devices is the Simple Object Access Protocol (SOAP). In FIG. 18, the variable-function device 110 can send SOAP signals to effect changes in the computer 105. As an example, the device description 1835 may provide a Uniform Resource Locator (URL) that provides a description for controlling the computer 105.

When the state of the computer 105 changes, the state information 1842 changes to state information 1843, with changes occurring in the state vector 1845. The subscribed devices (including variable-function device 110) are then notified via notification 1855 from the computer 105 of the state change in the computer 105. Content that is associated with the state change can be generated as an output 1805 by the output stage 1810 of the module 1815.

The variable-function device 110 may subscribe to other events (or state changes) that occur in another device in the network 1800. For example, the variable-function device 110 may subscribe to events in a peripheral device 1860 (e.g., a printer). If there is a state change in the peripheral device 1860 (e.g., a printer paper jam), then the peripheral device 1860 transmits a notification 1865 to the variable-function device 110. Based on this notification 1865, the output stage 1810 of the module 1815 can generate an output 1805 related to the notification 1865. Thus, the variable-function device 110 can mimic notifications generated by another device, if the variable-function device 110 subscribes to the other device. For example, if a printer paper jam condition occurs in the peripheral device 1860, then the message "printer paper jam" can be generated by the output stage 1810 of the module 1815.

It is further noted that the module 1815 can control the another device (e.g., peripheral device 1860, computer 105) by use of the UPnP standard.

Thus, an embodiment of the invention may permit many functions to be consolidated into, for example, one small, compact, tethered device or/and portable device. In one embodiment, the variable-function device 110 is compact in nature and requires minimal surface area and/or space. Thus, an embodiment of the variable-function device 110 may be conveniently placed on a user's desk, table, furniture, workspace, home counter, and/or other areas. Thus, in an embodiment, the variable-function device 110 may be optimally located in a position within each user's environment. An embodiment of the invention may permit functions to be removed from a computer (e.g., a PC) or other processing device in order to simplify the base system and/or components of the computer or other processing device. Additionally, an embodiment of the invention may permit the computer and variable-function device 110 to have, for example, separate development schedules to reduce risks, and/or separate definitions to enable changes and/or multiple offering of functions in the variable-function device 110. Additionally, since an embodiment of the invention permits functions to be removed from a computer or other processing device, the modified-function computer or other processing device can now be easier and cheaper to support in the field as compared to current computers or other current processing devices. Additionally, an embodiment of the invention may provide more functions to the user without burdening or increasing complexity to the main system in the computer or other processing device. As a result, the computer (or other processing device) may become more reliable, and the cost of service may be reduced for the computer (or other processing device).

Additionally, an embodiment of the invention may permit a user to be notified or receive feedback on events without requiring the computer display (or other processing device display) to be visible to the user. An embodiment of the invention may also offer to the user more feedback on the state of the user's computer environment. An embodiment of the invention may also reduce the clutter in the screen of the computer (or other processing device) by offering an alternative display location for selected functions.

An embodiment of the present invention may be advantageously utilized with any appliance (or device) that is adapted to communicate with a communication link and/or perform other processing functions, and thus is not limited to the variable-function devices as described in the foregoing embodiments.

The various engines discussed herein may be, for example, software, commands, data files, programs, code, modules, instructions, or the like, and may also include suitable mechanisms.

Reference throughout this specification to "one embodiment", "an embodiment", or "a specific embodiment" means that a particular feature, structure, or characteristic described in connection with the embodiment is included in at least one embodiment of the present invention. Thus, the appearances of the phrases "in one embodiment", "in an embodiment", or "in a specific embodiment" in various places throughout this specification are not necessarily all referring to the same embodiment. Furthermore, the particular features, structures, or characteristics may be combined in any suitable manner in one or more embodiments.

Other variations and modifications of the above-described embodiments and methods are possible in light of the foregoing teaching.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

It is also within the scope of the present invention to implement a program or code that can be stored in a machine-readable medium to permit a computer to perform any of the methods described above.

Additionally, the signal arrows in the drawings/Figures are considered as exemplary and are not limiting, unless otherwise specifically noted. Furthermore, the term "or" as used in this disclosure is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:

an I/O interface to communicate with a computing device via a communication link, the computing device being configured to determine whether the apparatus should generate content related to a detected event and to provide a signal to the apparatus indicating that the apparatus should generate content related to a detected event if it is determined that the apparatus should generate content; and at least one module communicatively coupled to the I/O interface configured to provide input or output functionality in response to receiving the signal from the computing device, wherein a first module is configured to generate an output in response to the signal, the apparatus being configurable to support a second module for providing an additional functionality in order to permit variable functionality by the apparatus or to permit expansion of functionalities in the apparatus.

2. The apparatus of claim 1, wherein the communication link is a wired path.

3. The apparatus of claim 1, wherein the communication link is a wireless path.

4. The apparatus of claim 1, wherein the output from the first module is received and processed by a second device.

* * * * *